(12) United States Patent
Chae

(10) Patent No.: US 12,191,724 B2
(45) Date of Patent: Jan. 7, 2025

(54) DUAL ROTOR MOTOR

(71) Applicants: HYUNDAI MOTOR COMPANY, Seoul (KR); KIA CORPORATION, Seoul (KR)

(72) Inventor: Min Ho Chae, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 352 days.

(21) Appl. No.: 17/949,616

(22) Filed: Sep. 21, 2022

(65) Prior Publication Data

US 2023/0318421 A1   Oct. 5, 2023

(30) Foreign Application Priority Data

Apr. 4, 2022   (KR) .......................... 10-2022-0041753

(51) Int. Cl.
*H02K 16/02*   (2006.01)
*H02K 21/02*   (2006.01)

(52) U.S. Cl.
CPC ........... *H02K 16/02* (2013.01); *H02K 21/021* (2013.01)

(58) Field of Classification Search
CPC .......... H02K 16/02; H02K 1/18; H02K 23/26; H02K 2213/09; H02K 21/021; H02K 21/02; H02K 21/04; H02K 21/028
USPC ........................................................ 310/114
See application file for complete search history.

(56) References Cited

U.S. PATENT DOCUMENTS

| | | |
|---|---|---|
| 6,924,574 B2 | 8/2005 | Qu et al. |
| 8,207,648 B2 | 6/2012 | Li et al. |
| 8,754,568 B2 | 6/2014 | Kim et al. |
| 8,987,962 B2 | 3/2015 | Kim |
| 2010/0244616 A1 | 9/2010 | Li et al. |
| 2013/0057091 A1 | 3/2013 | Kim et al. |
| 2013/0093276 A1 | 4/2013 | Kim |
| 2021/0036591 A1 | 2/2021 | Ryu et al. |
| 2021/0044186 A1 | 2/2021 | Ryu et al. |

FOREIGN PATENT DOCUMENTS

| | | | |
|---|---|---|---|
| JP | 2004336915 A | * | 11/2004 |
| JP | 4069796 B2 | | 1/2008 |
| JP | 2011155740 A | | 8/2011 |
| KR | 20100085057 A | | 7/2010 |
| KR | 20110139434 A | | 12/2011 |
| KR | 20130025141 A | | 3/2013 |
| KR | 102016250 B1 | | 8/2019 |
| KR | 102047880 B1 | | 12/2019 |
| KR | 20210085057 A | | 7/2021 |

OTHER PUBLICATIONS

Translation of JP 2004336915 A (Year: 2004).*

* cited by examiner

*Primary Examiner* — Christopher M Koehler
*Assistant Examiner* — Theodore L Perkins
(74) *Attorney, Agent, or Firm* — Lempia Summerfield Katz LLC

(57) ABSTRACT

A dual rotor motor includes: an inner rotor and an outer rotor; a stator disposed between the inner rotor and the outer rotor; a stator variable unit provided inside the stator to intermit a magnetic path between an outside and an inside of the stator according to a pressure in an axial direction; and a pressing mechanism provided to provide the pressure in the axial direction to the stator variable unit.

14 Claims, 3 Drawing Sheets

DUAL ROTOR MOTOR

CROSS-REFERENCE TO RELATED APPLICATION

The present application claims priority to and the benefit of Korean Patent Application No. 10-2022-0041753, filed on Apr. 4, 2022, the entire contents of which are incorporated herein by reference.

BACKGROUND OF THE DISCLOSURE

Field of the Disclosure

The present disclosure relates to a structure of a dual rotor motor.

Description of the Related Art

A dual rotor motor is a motor in which rotors are disposed on both of inner and outer circumferential surfaces of a stator, and the dual rotor motor is configured such that an inner rotor inside the stator and an outer rotor outside the stator may rotate independently of each other.

Therefore, the stator for independently driving the inner rotor and the outer rotor has slots in each of an inner peripheral surface and an outer peripheral surface, and each coil is wound using the slots.

The matters described as the background art are for the purpose of enhancing the understanding of the background of the present disclosure and should not be taken as acknowledging that these matters correspond to the related art already known to those having ordinary skill in the art.

SUMMARY OF THE DISCLOSURE

The present disclosure provides a dual rotor motor capable of varying a magnetic path connection state so that when an inner rotor and an outer rotor rotate at the same speed, the length of a magnetic path is decreased and the reluctance is reduced to increase the torque density of the motor.

A dual rotor motor of the present disclosure includes: an inner rotor and an outer rotor; a stator disposed between the inner rotor and the outer rotor; a stator variable unit provided in the stator to intermit a magnetic path between an outside and an inside of the stator according to a pressure in an axial direction; and a pressing mechanism provided to provide the pressure in the axial direction to the stator variable unit.

The stator may be disposed so that an inner teeth facing the inner rotor and an outer teeth facing the outer rotor are arranged in a radial direction. The stator variable unit may be deformed by the pressure in an axial direction provided by the pressing mechanism and may intermit the magnetic path between the inner teeth and the outer teeth.

The stator variable unit may be configured by stacking a plurality of wave silicon steel plates, and the pressing mechanism may be installed to vary the curvature of each of the wave silicon steel plates.

The wave silicon steel plate may be formed in a ring shape in which a wave portion having a curvature is formed only at a portion positioned between the inner teeth and the outer teeth in a circumferential direction of the stator.

The wave portion of the wave silicon steel plate may be formed outside the ring shape in a radial direction, and the wave of the wave portion may be formed in an arc shape in a cross-sectional view in the axial direction so that the arc shape may be unfolded in a straight line shape by the pressure in the axial direction provided by the pressing mechanism to remove a gap between the inner teeth and the outer teeth.

The pressing mechanism may include a piston which is installed to be slid in the axial direction on one side of the stacked wave silicon steel plates inside the stator so as to press one side of the stacked wave silicon steel plates. The pressing mechanism may also include a return spring provided to provide an elastic force so that the piston returns when the piston releases the pressure applied to the wave silicon steel plates.

A stopper may further be provided inside the stator to restrict an axial movement of wave silicon steel plates stacked on a side opposite to the piston with respect to the stacked wave silicon steel plates.

The wave silicon steel plates may be disposed only at a portion positioned between the inner teeth and the outer teeth in a circumferential direction of the stator. A blocking block configured to restrict a position in a circumferential direction of each of the wave silicon steel plates may be provided between the wave silicon steel plate in the circumferential direction of the stator.

The blocking block may be formed of a non-magnetic material and positioned between the inner slot and the outer slot of the stator.

In addition, the dual rotor motor of the present disclosure for achieving the object includes: an inner rotor and an outer rotor; a stator disposed between the inner rotor and the outer rotor; a stator variable unit provided in the stator to vary a size of a gap between an outside and an inside of the stator according to a pressure in an axial direction; and a pressing mechanism provided to provide the pressure in the axial direction to the stator variable unit.

The stator may be disposed so that the inner teeth facing the inner rotor and the outer teeth facing the outer rotor are arranged in a radial direction; and the stator variable unit may be deformed by the pressure in the axial direction provided by the pressing mechanism and may vary continuously the size of the gap between the inner teeth and the outer teeth.

The stator variable unit may be configured by stacking a plurality of wave silicon steel plates. The pressing mechanism may vary a curvature of each of the wave silicon steel plates and may vary continuously the size of the gap between the inner teeth and the outer teeth.

The pressing mechanism may include, inside the stator, a piston, which is installed to be slid in the axial direction so as to press one side of the stacked wave silicon steel plates. The pressing mechanism may also include a return spring configured to provide an elastic force so that the piston returns when the piston releases the pressure applied to the wave silicon steel plate.

The pressing mechanism may be connected to a pressure providing device that provides the pressure to the piston so that the piston slides in the axial direction. The pressure providing device may be installed to be controlled by a controller for controlling a motor.

When the inner rotor and the outer rotor are rotated independently of each other, the piston may not press the stator variable unit so that a gap between the inner teeth and the outer teeth is formed. When the inner rotor and the outer rotor rotate at the same speed, the piston may press the stator variable unit, and thus the controller controls the pressure providing device to remove the gap between the inner teeth and the outer teeth.

A dual rotor motor is configured to vary a magnetic path connection state so that, when an inner rotor and an outer rotor rotate at the same speed, the length of a magnetic path is decreased and the reluctance is reduced to increase the torque density of the motor.

BRIEF DESCRIPTION OF THE DRAWINGS

In order that the disclosure may be well understood, there will now be described various forms thereof, given by way of example, reference being made to the accompanying drawings, in which.

Figure 1:
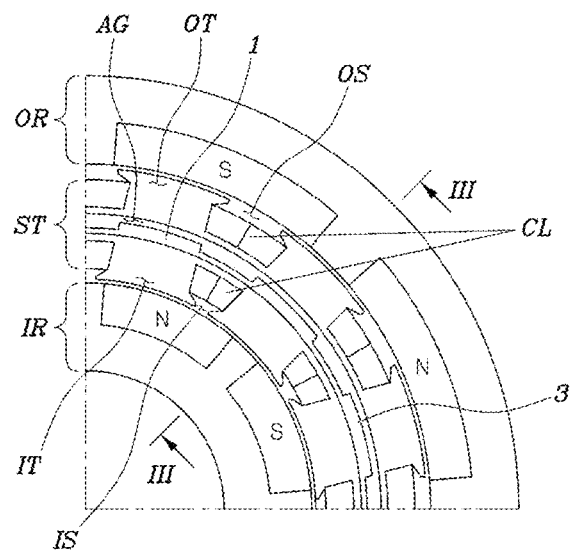
FIG. 1 is a view illustrating a dual rotor motor according to a first embodiment of the present disclosure in a state in which a magnetic path between inner teeth and outer teeth is blocked.

The drawings described herein are for illustration purposes only and are not intended to limit the scope of the present disclosure in any way.

DETAILED DESCRIPTION OF THE DISCLOSURE

Specific structural or functional descriptions of embodiments of the present disclosure disclosed in the present specification or application are only exemplified for the purpose of describing the embodiments according to the present disclosure. The embodiments according to the present disclosure may be carried out in various forms and should not be interpreted as being limited to the embodiments described in the present specification or application.

Since the embodiment according to the present disclosure may have various changes and various forms, specific embodiments are shown in the accompanying drawings and described in detail in the present specification or application. However, this is not intended to limit the embodiments according to the concept of the present disclosure to a specific disclosed form. The present disclosure should be understood to include all changes, equivalents, or substitutes included in the spirit and technical scope of the present disclosure.

The terms first, second, and so on may be used to describe various components, but components should not be limited by the terms. The terms are used only for the purpose of distinguishing one component from other components. For example, a first component may be referred to as a second component without departing from the scope according to the concept of the present disclosure. Similarly, the second component may also be referred to as the first component without departing from the scope according to the concept of the present disclosure.

When a certain component is said to be "connected" or "coupled" to another component, it should be understood that the certain component may be directly connected or coupled to another component. However, other components may also be present therebetween. On the other hand, when a certain component is said to be "directly connected to" or "directly coupled to" another component, it should be understood that other components are not present therebetween. Other expressions for describing the relationship between components, i.e., expressions such as "between" and "directly between" or "adjacent to" and "directly adjacent to" should also be interpreted in the same manner.

The terms used in the present specification are only used to describe the specific embodiments and are not intended to limit the present disclosure. The singular expression also includes the plural expression unless otherwise specified in the context. It should be understood that terms such as "comprises" or "has" used in the present specification specify the presence of the practiced feature, number, step, operation, component, part, or a combination thereof. However, these terms do not exclude the presence or addition possibility of one or more other features, numbers, steps, operations, components, parts, or a combination thereof in advance.

When a component, device, element, or the like of the present disclosure is described as having a purpose or performing an operation, function, or the like, the component, device, or element should be considered herein as being "configured to" meet that purpose or to perform that operation or function.

Unless defined otherwise, all terms used herein, including technical or scientific terms, have the same meaning as commonly understood by those having ordinary skill in the art to which the present disclosure pertains. Terms such as those defined in commonly used dictionaries should be interpreted as having meanings consistent with the meanings in the context of the related art and should not interpreted as an ideal or excessively formal meaning unless explicitly defined in the present specification.

Hereinafter, the present disclosure is described in detail by describing embodiments of the present disclosure with reference to the accompanying drawings. The same reference numerals presented in each drawing indicate the same or equivalent member.

Referring to FIGS. 1-6, a dual rotor motor according to embodiments of the present disclosure includes: an inner rotor IR and an outer rotor OR; a stator ST disposed between the inner rotor IR and the outer rotor OR; a stator variable unit SV provided in the stator ST to intermit a magnetic path between outside and the inside of the stator ST according to a pressure in an axial direction; and a pressing mechanism provided to provide the pressure in the axial direction to the stator variable unit SV.

In other words, the dual rotor motor according to the present disclosure is configured to vary a magnetic path connection state between the inside and the outside of the stator through the stator variable unit SV and the pressing mechanism. Therefore, when the inner rotor IR and the outer rotor OR rotate independently of each other, as shown in FIG. 1, a magnetic path formed by the stator ST and the outer rotor OR outside the stator ST and a magnetic path formed by the stator ST and the inner rotor IR inside the stator ST are blocked from each other and formed independently of each other.

Figure 2:
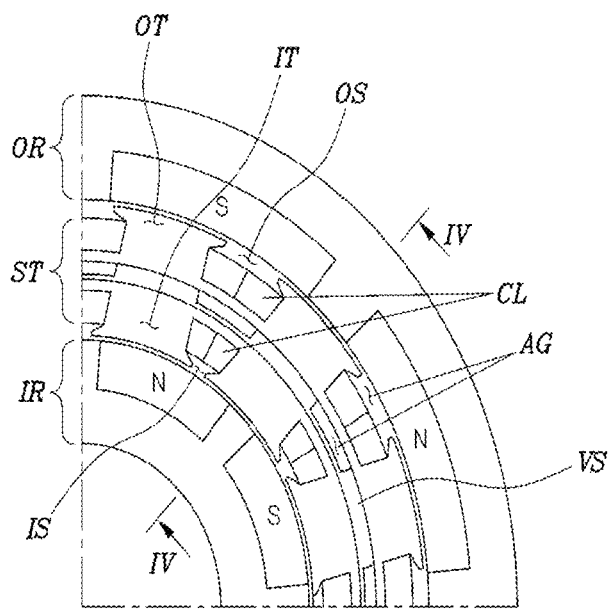
FIG. 2 is a view illustrating a state in which the magnetic path continues between the inner teeth and the outer teeth in the first embodiment of FIG. 1.

When the inner rotor IR and the outer rotor OR rotate at the same speed, as shown in FIG. 2, the inside and the outside of the stator ST are connected to form an integrated magnetic path. Accordingly, the overall length of a magnetic path formed among the stator ST, the inner rotor IR, and the outer rotor OR is decreased and the reluctance is reduced to increase the torque density of a motor.

For reference, a permanent magnet is disposed on each of the inner rotor IR and the outer rotor OR, and N and S, which mean two poles of the permanent magnet, are displayed on the drawing.

In one embodiment, the stator ST includes the inner teeth IT facing the inner rotor IR and the outer teeth OT facing the outer rotor OR. In particular, the inner teeth IT and outer teeth OT are arranged in a radial direction, and the stator variable unit SV is deformed by the pressure in an axial direction provided by the pressing mechanism. Thus the stator variable unit SV is configured to intermit a magnetic path between the inner teeth IT and the outer teeth.

In addition, an inner slot IS is provided between the inner teeth IT, an outer slot OS is provided between the outer teeth OT, and coils CL wound around the inner teeth IT and the outer teeth OT are positioned in each of the inner slot IS and the outer slot OS.

For reference, the axial direction is a rotational axis direction of a motor, and a radial direction is a radial direction from the rotational axis of the motor.

In embodiments of the present disclosure, the stator variable unit SV is configured by stacking a plurality of wave silicon steel plates 1, and the pressing mechanism is installed to vary a curvature of the wave silicon steel plate 1.

In a first embodiment illustrated in FIGS. 1-4, the wave silicon steel plate 1 constituting the stator variable unit SV is formed in a ring shape in which a wave portion 3 having a curvature is configured only at a portion positioned between the inner teeth IT and the outer teeth OT in a circumferential direction of the stator ST.

Figure 3:
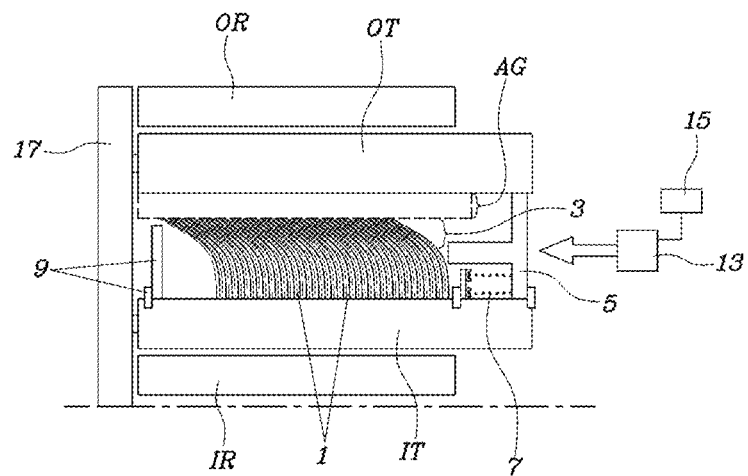
FIG. 3 is a cross-sectional view taken along line of FIG. 1.

In the present embodiment, as shown in FIG. 3, the wave portion 3 of the wave silicon steel plate 1 is mainly formed outside a ring shape in a radial direction, and a wave of the wave portion 3 is formed in an arc shape in a cross-sectional view in an axial direction. The arc shape is unfolded in a straight line by the pressure in the axial direction provided by the pressing mechanism. Thus, a gap AG between the inner teeth IT and the outer teeth OT may be removed.

The pressing mechanism is installed on one side of the stacked wave silicon steel plates 1 inside the stator ST to be slid in the axial direction. The pressing mechanism may include a piston 5 capable of pressing one side of the stacked wave silicon steel plates 1 and include a return spring 7 for providing an elastic force so that the piston 5 returns when the piston 5 releases the pressure applied to the wave silicon steel plate 1.

Figure 4:
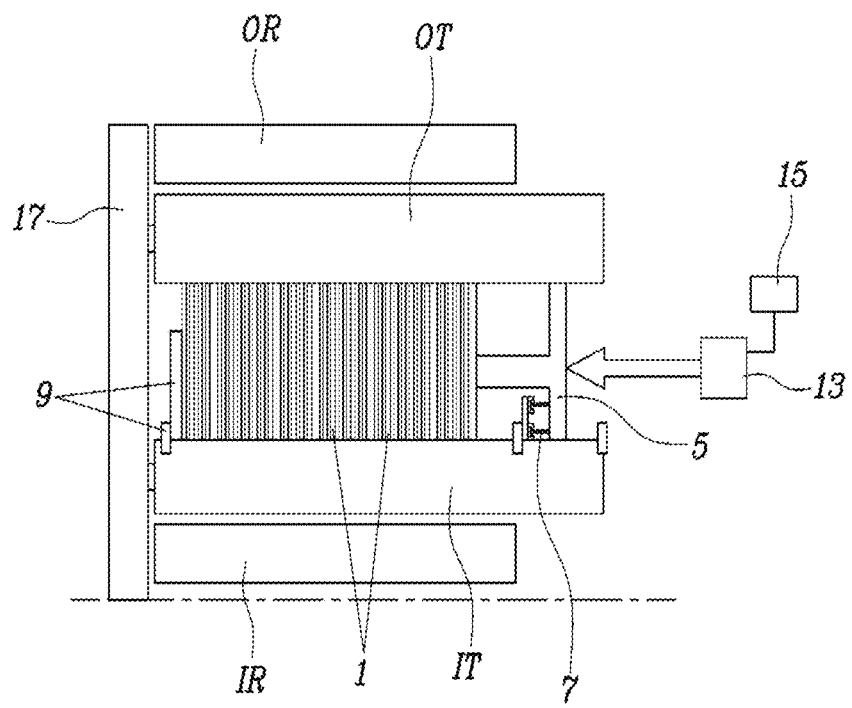
FIG. 4 is a cross-sectional view taken along line IV-IV of FIG. 2.

Of course, when an elastic force of the wave silicon steel plate 1 is at a level sufficient for smoothly returning from the state shown in FIG. 4 to the state shown in FIG. 3, the return spring 7 can be omitted.

In addition, in the present embodiment, a stopper 9 is provided to restrict an axial movement of the wave silicon steel plates 1 stacked on a side opposite to the piston 5 with respect to the stacked wave silicon steel plates 1 inside the stator ST.

Accordingly, when the piston 5 presses the stator variable unit SV, the wave silicon steel plate 1 of the stator variable unit SV is compressed between the stopper 9 and the piston 5, and an arc-shaped cross section is changed into a straight line-shaped cross section. Thus, the gap AG between the inner teeth IT and the outer teeth OT and connecting the magnetic path may be removed.

Referring to FIGS. 3 and 4, the outer teeth OT and the inner teeth IT of the stator ST are connected and fixed to a motor housing 17.

Figure 5:
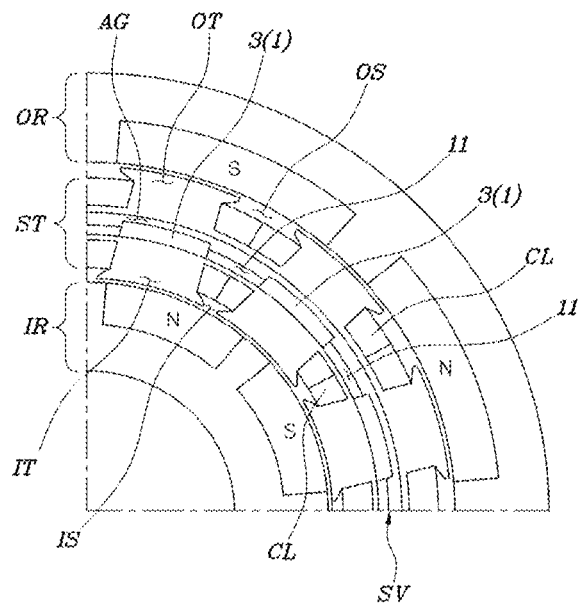
FIG. 5 is a view illustrating a dual rotor motor according to a second embodiment of the present disclosure in a state in which a magnetic path between the inner teeth and the outer teeth is blocked.
Figure 6:
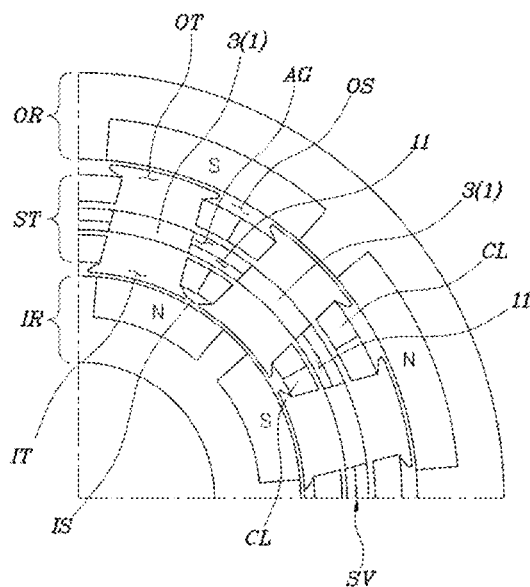
FIG. 6 is a view illustrating a state in which a magnetic path continues between the inner teeth and the outer teeth in the second embodiment of FIG. 5.

Meanwhile, as shown in FIGS. 5 and 6, in a second embodiment of the present disclosure, all components are the same as those in the first embodiment except for the stator variable unit SV that is different from that in the first embodiment. The wave silicon steel plate 1 constituting the stator variable unit SV is disposed only at a portion positioned between the inner teeth IT and the outer teeth OT in a circumferential direction of the stator ST, and a blocking block 11 for restricting a position in a circumferential direction of the wave silicon steel plates 1 is provided between the wave silicon steel plates 1 in a circumferential direction of the stator ST.

Accordingly, the blocking block 11 may be integrally formed in a protruding shape on the inner slot IS or the outer slot OS of the stator ST. In this case, it is desirable that the blocking block 11 protrudes only to a height at which gaps AG of a predetermined level or higher are formed between the inner slot IS and the outer slot OS and always blocks the magnetic path between the inner slot IS and the outer slot OS.

In addition, the blocking block 11 may be formed of a non-magnetic material positioned between the inner slot IS and the outer slot OS of the stator ST.

In this case, the blocking block 11 may protrude only to a height at which a gap AG between the inner slot IS and the outer slot OS is formed, but since the blocking block 11 itself is a non-magnetic material and blocks a magnetic path, the inner slot IS and the outer slot OS may be mechanically connected to each other without a separate gap AG. Thus, it is advantageous to secure the mechanical strength of the stator ST.

In the embodiments of the present disclosure as described above, the pressing mechanism is connected to the pressure providing device 13 that provides pressure to the piston 5 so that the piston 5 slides in an axial direction, and the pressure providing device 13 may be installed to be controlled by a controller 15 for controlling the motor.

Herein, the pressure providing device 13 may include a pneumatic pump, a hydraulic pump, a valve, a linear motor, or the like.

In the controller 15, when the inner rotor IR and the outer rotor OR are rotated independently of each other, the piston 5 may not press the stator variable unit SV so that a gap AG between the inner teeth IT and the outer teeth OT is formed. When the inner rotor IR and the outer rotor OR rotate at the same speed, the piston 5 may press the stator variable unit SV, and thus the controller 15 controls the pressure providing device 13 to remove the gap AG between the inner teeth IT and the outer teeth OT.

Accordingly, when the inner rotor IR and the outer rotor OR are independently rotated, the inner and outer magnetic paths of the stator ST are independently formed due to a gap AG between the inner teeth IT and the outer teeth OT, and thus independent driving of the inner rotor IR and the outer rotor OR can be stably performed.

In addition, when the inner rotor IR and the outer rotor OR rotate at the same speed, the gap AG between the inner teeth IT and the outer teeth OT is removed, and the magnetic paths inside and outside the stator ST are connected as one path, and thus the overall length of the magnetic paths is decreased compared to the magnetic paths formed independently inside and outside the stator ST. Thus, the reluctance is reduced, and ultimately, the torque density of a motor can be increased.

The embodiments of the present disclosure as described above may be expressed as follows.

In other words, a dual rotor motor of the present disclosure includes: an inner rotor IR and an outer rotor OR; a stator ST disposed between the inner rotor IR and the outer rotor OR; a stator variable unit SV provided inside the stator ST to vary the size of a gap AG between the outside and the inside of the stator ST according to the pressure in the axial direction; and a pressing mechanism provided to provide the pressure in the axial direction to the stator variable unit SV.

The stator ST is disposed so that the inner teeth IT facing the inner rotor IR and the outer teeth OT facing the outer rotor OR are arranged in a radial direction; and the stator variable unit SV is deformed by the pressure in the axial direction provided by the pressing mechanism and configured to continuously vary the size of a gap AG between the inner teeth IT and the outer teeth OT.

The stator variable unit SV is configured by stacking a plurality of wave silicon steel plates 1; and the pressing mechanism may be configured to continuously vary the size of a gap AG between the inner teeth IT and the outer teeth OT by varying a curvature of the wave silicon steel plate 1.

The pressing mechanism may include a piston 5 installed in the stator ST to press one side of the stacked wave silicon steel plates 1 by sliding in the axial direction; and a return spring 7 for providing an elastic force so that the piston 5 returns when the piston 5 releases the pressure applied to the wave silicon steel plate 1.

In addition, the pressing mechanism is connected to the pressure providing device 13 that provides pressure to the piston 5 so that the piston 5 slides in the axial direction. The pressure providing device 13 is installed to be controlled by a controller 15 for controlling the motor. In the controller 15, when the inner rotor IR and the outer rotor OR are rotated independently of each other, the piston 5 may not press the stator variable unit SV so that a gap AG between the inner teeth IT and the outer teeth OT is formed. When the inner rotor IR and the outer rotor OR rotate at the same speed, the piston 5 may press the stator variable unit SV, and thus the controller 15 controls the pressure providing device 13 to remove the gap AG between the inner teeth IT and the outer teeth OT.

Although specific embodiments of the present disclosure have been shown and described, it should be apparent to those having ordinary skill in the art that the present disclosure may be variously modified and changed without departing from the technical spirit of the present disclosure.

What is claimed is:

1. A dual rotor motor comprising:
an inner rotor and an outer rotor;
a stator disposed between the inner rotor and the outer rotor;
a stator variable unit provided inside the stator to intermit a magnetic path between an outside and an inside of the stator according to a pressure in an axial direction; and
a pressing mechanism provided to provide the pressure in the axial direction to the stator variable unit.

2. The dual rotor motor of claim 1, wherein:
the stator is disposed so that an inner teeth facing the inner rotor and an outer teeth facing the outer rotor are arranged in a radial direction; and
the stator variable unit is deformed by the pressure in the axial direction provided by the pressing mechanism and intermits the magnetic path between the inner teeth and the outer teeth.

3. The dual rotor motor of claim 2, wherein:
the stator variable unit is configured by stacking a plurality of wave silicon steel plates; and
the pressing mechanism is installed to vary a curvature of each of the wave silicon steel plates.

4. The dual rotor motor of claim 3, wherein the wave silicon steel plate is formed in a ring shape in which a wave portion having a curvature is formed only at a portion positioned between the inner teeth and the outer teeth in a circumferential direction of the stator.

5. The dual rotor motor of claim 4, wherein:
the wave portion of the wave silicon steel plate is formed outside the ring shape in the radial direction; and
the wave of the wave portion is formed in an arc shape in a cross-sectional view in the axial direction so that the arc shape is unfolded in a straight line shape by the pressure in the axial direction provided by the pressing mechanism to remove a gap between the inner teeth and the outer teeth.

6. The dual rotor motor of claim 3, wherein the pressing mechanism comprises:
a piston installed to be slid in the axial direction on one side of the stacked wave silicon steel plates inside the stator so as to press one side of the stacked wave silicon steel plates; and
a return spring provided to provide an elastic force so that the piston returns when the piston releases the pressure applied to the wave silicon steel plates.

7. The dual rotor motor of claim 6, wherein a stopper is further provided to restrict an axial movement of the wave silicon steel plates stacked on a side opposite to the piston with respect to the stacked wave silicon steel plates inside the stator.

8. The dual rotor motor of claim 3, wherein:
the wave silicon steel plates are disposed only at a portion positioned between the inner teeth and the outer teeth in a circumferential direction of the stator; and
a blocking block configured to restrict a position in a circumferential direction of each of the wave silicon steel plates is provided between the wave silicon steel plates in the circumferential direction of the stator.

9. The dual rotor motor of claim 8, wherein the blocking block is formed of a non-magnetic material and positioned between the inner slot and the outer slot of the stator.

10. A dual rotor motor comprising:
an inner rotor and an outer rotor;
a stator disposed between the inner rotor and the outer rotor;
a stator variable unit provided inside the stator to vary a size of a gap between an outside and an inside of the stator according to a pressure in an axial direction; and
a pressing mechanism provided to provide the pressure in the axial direction to the stator variable unit.

11. The dual rotor motor of claim 10, wherein:
the stator is disposed so that the inner teeth facing the inner rotor and the outer teeth facing the outer rotor are arranged in a radial direction; and
the stator variable unit is deformed by the pressure in the axial direction provided by the pressing mechanism and varies continuously the size of the gap between the inner teeth and the outer teeth.

12. The dual rotor motor of claim 11, wherein:
the stator variable unit is configured by stacking a plurality of wave silicon steel plates; and
the pressing mechanism varies a curvature of each of the wave silicon steel plates and varies continuously the size of the gap between the inner teeth and the outer teeth.

13. The dual rotor motor of claim 12, wherein the pressing mechanism comprises:
   a piston installed to be slid in the axial direction so as to press one side of the stacked wave silicon steel plates inside the stator; and
   a return spring configured to provide an elastic force so that the piston returns when the piston releases the pressure applied to the wave silicon steel plates.

14. The dual rotor motor of claim 13, wherein:
   the pressing mechanism is connected to the pressure providing device that provides the pressure to the piston so that the piston slides in the axial direction; and
   the pressure providing device is installed to be controlled by a controller for controlling the motor,
   wherein, when the inner rotor and the outer rotor are rotated independently of each other, the piston does not press the stator variable unit so that a gap between the inner teeth and the outer teeth is formed, and when the inner rotor and the outer rotor rotate at the same speed, the piston presses the stator variable unit, and thus the controller controls the pressure providing device to remove the gap between the inner teeth and the outer teeth.

\* \* \* \* \*